United States Patent
Ling

(10) Patent No.: US 11,923,539 B2
(45) Date of Patent: Mar. 5, 2024

(54) LITHIUM ANTIMONIDE SULFIDE AS LI CONDUCTIVE COMPOUNDS FOR THE APPLICATION OF THICK COATING LAYER IN LI METAL BATTERY AND SOLID ELECTROLYTE IN ALL-SOLID-STATE LITHIUM BATTERIES

(71) Applicant: TOYOTA MOTOR ENGINEERING & MANUFACTURING NORTH AMERICA, INC., Plano, TX (US)

(72) Inventor: Chen Ling, Troy, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 230 days.

(21) Appl. No.: 17/176,401

(22) Filed: Feb. 16, 2021

(65) Prior Publication Data
US 2022/0263080 A1    Aug. 18, 2022

(51) Int. Cl.
| | |
|---|---|
| H01M 4/38 | (2006.01) |
| H01M 4/36 | (2006.01) |
| H01M 10/0525 | (2010.01) |
| H01M 10/0562 | (2010.01) |

(52) U.S. Cl.
CPC .......... *H01M 4/382* (2013.01); *H01M 4/366* (2013.01); *H01M 10/0525* (2013.01); *H01M 10/0562* (2013.01); *H01M 2300/0068* (2013.01)

(58) Field of Classification Search
CPC .......................... H01M 10/0562; H01M 4/382
See application file for complete search history.

(56) References Cited

U.S. PATENT DOCUMENTS

| | | | | |
|---|---|---|---|---|
| 2018/0366769 | A1* | 12/2018 | Ling | H01M 10/0562 |
| 2021/0242490 | A1* | 8/2021 | Ku | H01M 4/366 |

OTHER PUBLICATIONS

Liang et al. "Li10Ge (P1-x Sb x) 2S12 lithium-ion conductors with enhanced atmospheric stability." Chemistry of Materials 32.6 (2020): 2664-2672. (Year: 2020).*
Venugopal et al.(2013). Physiologic and Chemical Basis for Metal Toxicity. Germany: Springer US. p. 113 (Year: 2013).*
Jain et al. The Materials Project: A materials genome approach to accelerating materials innovation APL Materials, 2013, 1(1), 011002. doi:10.1063/1.4812323 (Year: 2013).*
Kaup, Kavish, et al. "Fast Li-Ion Conductivity in Superadamantanoid Lithium Thioborate Halides." Angewandte Chemie International Edition 60.13 (2021): 6975-6980. (Year: 2021).*

* cited by examiner

*Primary Examiner* — Sadie White
*Assistant Examiner* — Kayla Elaine Clary
(74) *Attorney, Agent, or Firm* — Oblon, McClelland, Maier & Neustadt, L.L.P.

(57) ABSTRACT

Lithium antimony sulfide compounds having lithium ion conductivity of at least $10^{-5}$ S/cm are described. The materials are useful as coatings of lithium metal anodes to preevent dendrite formation and provide lithium metal batteries having high energy density.

5 Claims, 16 Drawing Sheets
(16 of 16 Drawing Sheet(s) Filed in Color)

MP-760409
S.G.: P4/mmm

MP-760407
S.G.: P2$_1$

MP-754496
S.G.: P2₁2₁2₁

MP-1177070
S.G.: Pmma

MP-753621
S.G.: C2/c

MP-767403
S.G.: Pnma

MP-1177072
S.G.: P2₁/c

MP-768139
S.G.: C2/c

LITHIUM ANTIMONIDE SULFIDE AS LI CONDUCTIVE COMPOUNDS FOR THE APPLICATION OF THICK COATING LAYER IN LI METAL BATTERY AND SOLID ELECTROLYTE IN ALL-SOLID-STATE LITHIUM BATTERIES

FIELD OF DISCLOSURE

This disclosure is directed to novel Lithium antimonide sulfide compounds and doped. derivatives thereof having a selected crystal structure exhibiting high lithium ion conductivity which are useful as protective coatings for lithium metal electrodes and/or solid electrolytes for solid state Li ion and Li metal batteries.

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-conductive phase would alleviate this safety issue, and may provide additional advantages such as improved mechanical and thermal stability. A primary function of the solid Li-conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and thus, short circuits the battery, energy is rapidly released and may initiate ignition of the organic solvent.

Moreover, to provide batteries for large scale energy storage an increase in the practical energy density is required. The Li-metal battery and all-solid-state batteries offer potential advancement in the increase of energy density. With the extra-high capacity (3860 mAh g-1) and the lowest negative electrochemical potential, Li metal is the ideal anode candidate to offer the promise of high energy density. The Li metal batteries (LMBs), including Li-sulfur (Li—S) batteries, Li-oxygen (Li—$O_2$) batteries, Li anode vs intercalation type cathode batteries, etc., have the potential to provide a huge increase in theoretical energy density relative to the current LIBs. However, the usage of Li metal anode is prone to the dendritic growth detrimental to the battery safety. The use of coating layer materials on the lithium metal is a strategy being studied to enable utility of Li metal anodes to advance Li metal battery technology. To enhance the safety of the electrode without sacrificing battery performance, the coating materials must provide important properties, including
  (1). High Li conductivity
  (2). Chemical and electrochemical stability when contacting metal
  (3). Desired mechanical strength to prevent Li dendrite penetration. The mechanical modulus should not to be too high to disable Li wetting.

These criteria strictly limit the choice of materials suitable for Li metal coating. For instance, criterion (1) implies the potential application of solid-state Li-ion conductors as coating materials. However, the majority of known solid-state Li-ion conductors such as $Li_3PS_4$, $Li_{10}GeP_2S_{12}$, $Li_7La_3Zr_2O_{12}$ and $Li_{1.3}Al_{0.3}Ti_{1.7}(PO_4)_3$ all react with metal Li at certain voltages and thus, do not meet the second requirement. in addition, the high modulus of oxide conductors (Young's modulus>150 GPa, shear modulus>~50 GPa) suggests poor Li wetting capability, making the contact of coating layer on metal Li anode challenging. Materials with improved stability against reaction with metal Li have been used as lithium metal coating. However, the low conductivity of these materials limits the coating thickness to a range of from nanometers to a few tens of nanometers. Such thin coating thickness cannot fully prevent dendrite growth and. penetration and thus do not necessarily eliminate the safety risk associated with dendrite formation.

Therefore, there is much interest and effort focused on the discovery of new solid Li-ion conducting materials suitable as lithium metal anode coating materials or solid state electrolytes which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$). However, as described above these materials do not fully meet the criterion required especially for lithium metal coating materials.

A desirable coating material should not cause any appreciable increase of internal resistance. A simple estimation of the bulk resistance is R=L/σA, where L is the thickness of the coating layer, A is the area and o is the conductivity. For an increase of bulk resistance at I Ω·$cm^2$, a thickness of 1 μm coating requires the lithium conductivity at $10^{-4}$ S/cm. The critical coating thickness which can be applied increases with higher conductivity. For instance, a conductivity of $10^{-3}$ S/cm allows thicker coating of 10 μm for the same increase of bulk resistance.

In the description of the embodiments of the present disclosure a thickness of 100 μm or higher will be considered as a thick coating and therefore, a conductivity of at least $10^{-5}$ S/cm is required to qualify a material to be suitable as a thick coating material.

An ideal protection material should be intrinsically stable in contact with the metal Li anode so that any change caused by the cycled dissolution and deposition of lithium is alleviated or minimized. The standard redox potential of Li/Li+ is −3.04 V, making metal Li one of the strongest reducing agents known. Metal Li is able to chemically reduce the majority of the cationic species to lower oxidation state and as a result, many lithium-conductive compounds that contain a second type of cation react with lithium. For example, the conductor of $Li_3PS_4$ has $P^{5+}$ in the formula. When contacted with metal Li, the $P^{5+}$ is reduced according to the following reactions (J. Mater. Chem. A. 2016,4, 3253-3266).

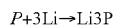

As another example, $Li_{10}GeP_2S_{12}$, contains both $Ge^{4+}$ and $P^{5+}$ in the formula. In contact with lithium metal the following redox chemistry takes place (J. Mater. Chem. A, 2016,4, 3253-3266).

$$Li_{10}GeP_2S_{12} + 10Li \rightarrow 2P + 8Li_2S + Li_4GeS_4$$

$$P + 3Li \rightarrow Li3P$$

$$4Li_4GeS_4 + 31Li \rightarrow 16Li_2S + Li_{15}Ge_4$$

These reactions all involve the reduction of the secondary cation. For a chemical substance with Li⁺ as the only cation, the material will be intrinsically stable against the reduction by lithium. Such compounds include $Li_3N$, $Li_2O$, $Li_2S$, LiF, LiCl, LiBr, LiI, $Li_3As$ and $Li_3Sb$. The only compound of this group with room temperature Li-ion conductivity higher than $10^{-6}$ S/cm is $Li_3N$, while the other six typically have conductivity lower than $10^{-10}$ S/cm.

In addition to the above binary lithium compounds, several lithium compounds display two or more types of anions while presenting lithium as the only cation in the formula. One example is $Li_3OX$, where X is Cl or Br, This family of compounds shows high room temperature conductivity greater than $10^{-3}$ S/cm (J. Am. Chem. Soc. 2012, 134, 15342), The inventors of this application have been studying lithium compounds which may serve for future use of solid-state Li+ conductors and previous results of this study are disclosed in U.S. application Ser. No. 15/626,696, filed Jun. 19, 2017, U.S. Ser. No. 15/805,672, filed Nov. 7, 2017, U.S. application Ser. No. 16/013,495, filed Jun. 20, 2018, U.S. application Ser. No. 16/114,946 filed Aug. 28, 2018, U.S. application Ser. No. 16/142,217 filed Sep. 26, 2018, U.S. application Ser. No. 16/144,157 filed Sep. 27, 2018. U.S. application Ser. No. 16/153,335 filed Oct. 10, 2018, U.S. application Ser. No. 16/155,349 filed Oct. 9, 2018, U.S. application Ser. No. 16/264,294, filed Jan. 31, 2019. U.S. application Ser. No. 16/570,811, filed Sep. 13, 2019, and U.S. application Ser. No. 16/570,888, filed. Sep. 13, 2019. However, research effort continues to discover additional materials having maximum efficiency, high stability, low cost and ease of handling and manufacture. Further, as disclosed in the present application materials which may serve as thick coating protective layers for lithium metal and lithium metal alloy anodes are also of great interest.

Accordingly, an object of this application is to identify a range of materials having high Li ion conductivity while being poor electron conductors which are suitable as thick coating materials for lithium metal electrodes (anodes) and suitable as solid state electrolytes and/or electrode components for lithium ion and lithium metal batteries.

A further object of this application is to provide a solid state lithium metal battery and/or a solid state lithium ion battery containing these materials.

SUMMARY OF THE EMBODIMENTS

These and other objects are provided by the embodiments of the present application, the first embodiment of which includes an electrode comprising:
an active layer of lithium metal or a lithium metal alloy; and
a coating layer on a surface of the active layer in contact with the lithium metal or lithium metal alloy;
wherein the coating layer is at least one material having a lithium ion conductivity of at least $10^{-5}$ S/cm selected from formula (I), formula (II), formula (III) and formula (IV):

$$Li_5SbS \qquad (I)$$

$$Li_{5-2x}Sb_{1-x}A_xS \qquad (II)$$

$$Li_{5-y}Sb_{1-y}S_{1+y} \qquad (III)$$

$$Li_{5-z}SbS_{1-z}H_z \qquad (IV)$$

wherein A is at least one anion aliovalently substituted for Sb in sites of the crystal lattice selected from the group of anions consisting of F, Cl⁻ and Br⁻, H is at least one anion aliovalently substituted for S in sites of the crystal lattice selected from the group of anions consisting of F⁻, Cl⁻ and Br⁻, x is a number from greater than 0 to 0.5, y is a number from greater than 0 to 0.5, z is a number from greater than 0 to 0.5, and the materials of formulae (I) to (IV) have a crystal structure of a space group selected from the group consisting of P4/mmm, P2₁, P2₁2₁2₁, Pmma, P2/c and Pnma.

In an aspect of the first embodiment a thickness of the coating layer is at least 100 nm.

In one specific aspect of the first embodiment the crystal structure of the coating material is of the P4/mmm space group, the lithium ion conductivity is from 0.11 mS/cm to 1.80 mS/cm and a thickness of the coating layer having a resistance of 1 Ω·cm² is from 1 μm to 10 μm.

In one specific aspect of the first embodiment the crystal structure of the coating material is of the P2₁ space group, the lithium ion conductivity is from 3.0 mS/cm to 6.1 mS/cm and a thickness of the coating layer having a resistance of 1 Ω·cm² is from 30 μm to 72 μm.

In one specific aspect of the first embodiment the crystal structure of the coating material is of the P2₁2₁2₁ space group, the lithium ion conductivity is from 0.05 mS/cm to 6.6 mS/cm and a thickness of the coating layer having a resistance of 1 Ω·cm² is from 0.6 μm to 65.2 μm.

In one specific aspect of the first embodiment the crystal structure of the coating material is of the Pmma space group, the lithium ion conductivity is from 0.10 mS/cm to 5.5 mS/cm and a thickness of the coating layer having a resistance of 1 Ω·cm² is from 1.0 μm to 55 μm.

In one specific aspect of the first embodiment the crystal structure of the coating material is of the P2/c space group, the lithium ion conductivity is from 0.40 mS/cm to 30 mS/cm and a thickness of the coating layer having a resistance of 1 Ω·cm² is from 4.0 μm to 295 μm.

In one specific aspect of the first embodiment the crystal structure of the coating material is of the Pnma space group, the lithium ion conductivity is from 1.3 mS/cm to 4.7 mS/cm and a thickness of the coating layer having a resistance of 1 Ω·cm² is from 19 μm to 47 μm.

In a second embodiment the present disclosure provides a battery comprising the electrode of the first embodiment, wherein the battery is a lithium metal battery.

In a third embodiment the present disclosure provides an electrode comprising:
an active layer of lithium metal or a lithium metal alloy; and
a coating layer on a surface of the active layer in contact with the lithium metal or lithium metal alloy;
wherein the coating layer is at least one material having a lithium ion conductivity of at least $10^{-5}$ S/cm selected from formula (V), formula (VI), formula (VII) and formula (VIII):

$$Li_8Sb_2S \qquad (V)$$

$$Li_{8-2m}Sb_{2-m}A_mS \qquad (VI)$$

$$Li_{8-n}Sb_{2-n}S_{1+n} \qquad (VII)$$

$$Li_{8-k}Sb_2S_{1-k}H_k \qquad (VIII)$$

wherein A is at least one anion aliovalently substituted for Sb in sites of the crystal lattice selected from the group of anions consisting of F⁻, Cl⁻ and Br⁻, H is at least one anion aliovalently substituted for S in sites of the crystal lattice selected from the group of anions consisting of F⁻, Cl⁻ and Br⁻, m is a number from greater than 0 to 0.5, n is a number from greater than 0 to 0.5, k is a number from greater than 0 to 0.5, and the materials of formulae (V) to (VIII) have a crystal structure of space group C2/c.

In an aspect of the third embodiment the lithium ion conductivity of the coating material is from 2.6 mS/cm to 20 mS/cm and a thickness of a coating layer having a resistance of 1 Ω·cm² is from 25 μm to 200 μm.

In a fourth embodiment the present disclosure provides a battery comprising the electrode of the third embodiment, wherein the battery is a lithium metal battery.

In a fifth embodiment the present disclosure provides a solid state lithium battery, comprising, in the order listed:
an anode comprising an active layer of lithium metal or a lithium metal alloy;
a coating layer on a surface of the active layer in contact with the lithium metal or lithium metal alloy;
a solid electrolyte conductive of lithium ions contacting the coating layer; and
a cathode comprising an active layer which adsorbs or intercalates lithium ions;
wherein the coating layer is at least one material having a lithium ion conductivity of at least 10⁻⁵ S/cm selected from formula (I), formula (II), formula (III) and formula (IV):

$$Li_5SbS \quad (I)$$

$$Li_{5-2x}Sb_{1-1}A_xS \quad (II)$$

$$Li_{5-y}Sb_{1-y}S_{1+y} \quad (III)$$

$$Li_{5-z}Sbs_{1-z}H_z \quad (IV)$$

wherein A is at least one anion aliovalently substituted for Sb in sites of the crystal lattice selected from the group of anions consisting of F⁻, Cl⁻ and Br⁻, H is at least one anion aliovalently substituted for S in sites of the crystal lattice selected from the group of anions consisting of F⁻, Cl⁻ and Br⁻, x is a number from greater than 0 to 0.5, y is a number from greater than 0 to 0.5, z is a number from greater than 0 to 0.5, and the materials of formulae (I) to (IV) have a crystal structure of a space group selected from the group consisting of P4/mmm, P2₁, P2₁2₁2₁, Pmma, P2/c, and Pnma.

In a special aspect of the fifth embodiment a thickness of the coating layer is at least 100 nm.

In one specific aspect of the fifth embodiment the crystal structure of the coating material is of the P4/mmm space group, the lithium ion conductivity is from 0.11 mS/cm to 1.80 mS/cm and a thickness of the coating layer having a resistance of 1 Ω·cm² is from 1 μm to 10 μm.

In one specific aspect of the fifth embodiment the crystal structure of the coating material is of the P2₁ space group, the lithium ion conductivity is from 3.0 mS/cm to 6.1 mS/cm and a thickness of the coating layer having a resistance of 1 Ω·cm² is from 30 μm to 72 μm, In one specific aspect of the fifth embodiment the crystal structure of the coating material is of the P2₁2₁2₁ space group, the lithium ion conductivity is from 0.05 mS/cm to 6.6 mS/cm and a thickness of the coating layer having a resistance of 1 Ω·cm² is from 0.6 μm to 65.2 μm.

In one specific aspect of the fifth embodiment the crystal structure of the coating material is of the Pmma space group, the lithium ion conductivity is from 0.10 mS/cm to 5.5 mS/cm and a thickness of the coating layer having a resistance of 1 Ω·cm² is from 1.0 μm to 55 μm.

In one specific aspect of the fifth embodiment the crystal structure of the coating material is of the P2/c space group, the lithium ion conductivity is from 0.40 mS/cm to 30 mS/cm and a thickness of the coating layer having a resistance of 1 Ω·cm² is from 4.0 μm to 295 μm.

In one specific aspect of the fifth embodiment the crystal structure of the coating material is of the Pnma space group, the lithium ion conductivity is from 1.3 mS/cm to 4.7 mS/cm and a thickness of the coating layer having a resistance of 1 Ω·cm² is from 19 μm to 47 μm.

In a sixth embodiment the present disclosure provides a solid state lithium battery, comprising, in the order listed:
an anode comprising an active layer of lithium metal or a lithium metal alloy;
a coating layer on a surface of the active layer in contact with the lithium metal or lithium metal alloy;
a solid electrolyte conductive of lithium ions contacting the coating layer; and
a cathode comprising an active layer which adsorbs or intercalates lithium ions;
wherein the coating layer is at least one material having a lithium ion conductivity of at least 10⁻⁵ S/cm selected from formula (V), formula (VI), formula (VII) and formula (VIII):

$$Li_8Sb_2S \quad (V)$$

$$Li_{8-2m}Sb_{2-m}A_mS \quad (VI)$$

$$Li_{8-n}Sb_{2-n}S_{1+n} \quad (VII)$$

$$Li_{8-k}Sb_2S_{1-k}H_k \quad (VIII)$$

wherein A is at least one anion aliovalently substituted for Sb in sites of the crystal lattice selected from the group of anions consisting of F⁻, Cl⁻ and Br⁻, H is at least one anion aliovalently substituted for S in sites of the crystal lattice selected from the group of anions consisting of F⁻, Cl⁻ and Br⁻, m is a number from greater than 0 to 0.5, n is a number from greater than 0 to 0.5, k is a number from greater than 0 to 0.5, and the materials of formulae (V) to (VIII) have a crystal structure of space group C2/c.

In an aspect of the sixth embodiment the lithium ion conductivity of the coating layer is from 2.6 mS/cm to 20 mS/cm and a thickness of the coating layer having a resistance of 1 Ω·cm² is from 25 μm to 200 μm.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1A:
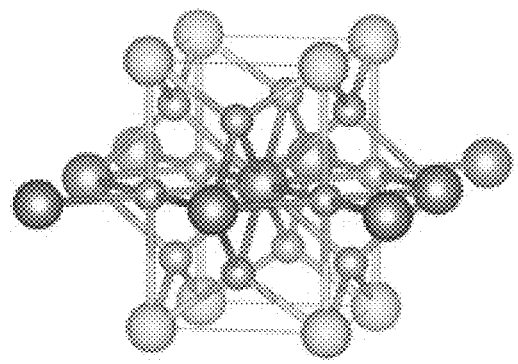
FIG. 1A shows the crystal structure of lithium antimony sulfides of space group P4/mmm.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-4031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors are conducting ongoing investigations of lithium compounds in order to identify materials having the properties which may serve as solid-state electrolytes in solid state lithium batteries and as described herein, thick protective coatings for lithium metal electrodes. In the course of this ongoing study and effort the inventors have developed and implemented a methodology to identify composite materials or compounds which have chemical and structural properties which have been determined by the inventors as indicators of lithium ion conductance suitable to be a solid state electrolyte for a lithium-ion battery, a thick coating for a lithium metal electrode and components of an electrode adjacent to the solid state electrolyte.

To qualify as solid state electrolyte in practical applications, the material must meet several certain criteria. First, it should exhibit desirable Li-ion conductivity, usually no less than $10^{-6}$ S/cm at room temperature. Second, the material should have good stability against chemical, electrochemical and thermal degradation. Third, the material should have low grain boundary resistance for usage in all solid-state battery. Fourth, the synthesis of the material should be easy and the cost should not be high.

A criterion of this present methodology requires that to qualify as a thick coating material for a lithium metal or lithium metal alloy electrode, the material must exhibit a Li-ion conductivity no less than $10^{-5}$ S/cm at room temperature.

As described in the present embodiments this evaluation technology is applied to lithium antimonide sulfides as coating materials to protect a lithium metal anode. The general formula of lithium antimonide sulfides can be written as $Li_{2+x}Sb_xS_{1-x}$. Taking the value of x as 0.5 and ⅔ gives the formulae $Li_5SbS$ and $Li_8Sb_2S$, respectively.

These materials were then searched in the Materials Project database (A. Jain*, S. P. Ong*, G. Hautier, W. Chen, W. D. Richards, S. Dacek, S. Cholia, D. Gunter, D. Skinner, G. Ceder, K. A. Persson (*=equal contributions) *The Materials Project: A materials genome approach to accelerating materials innovation* APL Materials, 2013, 1(1), 011002. doi:10.1063/1.4812323 [bibtex]) and it was determined that $Li_5SbS$ may exist in nine different polymorphs while $Li_8Sb_2S$ is identified as having one polymorph. The thermodynamic properties of the compounds of the crystalline structure profiles listed in the Materials Project database were evaluated according to density functional theory calculations. Table 1 lists the calculated formation energy (FE) and convex hull energy ($E_{Hull}$). The formation energy in general describes the energy release to form a compound from the elemental state, while the convex hull energy is typically used to measure the thermodynamic stability against the decomposition into ground states. All lithium antimonide sulfides are metastable against decomposition into $Li_3Sb$ and $Li_2S$.

TABLE 1

Formation energy and convex hull energy of lithium antimonide sulfides.

| MP ID | Formula | Space group | FE (eV/atom) | $E_{Hull}$ (eV/atom) |
|---|---|---|---|---|
| mp-760409 | $Li_5SbS$ | P4/mmm | −0.98 | 0.05 |
| mp-760407 | $Li_5SbS$ | $P2_1$ | −0.94 | 0.089 |
| mp-754496 | $Li_5SbS$ | $P2_12_12_1$ | −0.98 | 0.048 |
| mp-1177070 | $Li_5SbS$ | Pmma | −0.98 | 0.051 |
| mp-753621 | $Li_5SbS$ | C2/c | −0.97 | 0.063 |
| mp-767403 | $Li_5SbS$ | Pnma | −0.96 | 0.064 |
| mp-1177072 | $Li_5SbS$ | $P2_1/c$ | −0.94 | 0.087 |
| mp-775372 | $Li_5SbS$ | $P2_1/c$ | −0.93 | 0.105 |
| mp-777471 | $Li_5SbS$ | $P2_1$ | Unrealistic structure model | |
| mp-768139 | Li8Sb2S | C2/c | −0.81 | 0.070 |

The crystal structure space groups are shown in FIGS. 1A-1H wherein lithium ions are shown in Green: sulfur ions in yellow and antimony ions in brown.

Ab initio molecular dynamics simulation (AIMD) studies were applied to calculate the diffusivity of Li ion in the lattice structures of these lithium antinionde sulfide materials. In order to accelerate the simulation, the calculation was performed at high temperatures and the effect of excess Li or Li vacancy was considered.

A series of AIMD simulations were performed from 550K to 1200K. Each simulation was performed for a duration sufficiently long so that the total number of hopping events exceeded 400. The difffusivities at the simulated temperatures were contained using the Einstein equation.

The diffusivity at 300 K was determined according to equation (I)

$$D = D_0 \exp(-E_a/k_b T) \quad \text{equation (I)}$$

where $D_0$, $E_a$ and $k_b$ are the pre-exponential factor, activation energy and. Boltzmann constant, respectively. The conductivity is related with the calculated diffusivity according to equation (II):

$$\sigma = D_{300} \rho e^2 / k_b T \quad \text{equation (II)}$$

where $\rho$ is the volumetric density of Li ion and e is the unit charge.

To create mobile defects, aliovalent doping of anions at $Sb^{3-}$ or $S^{2-}$ sites was evaluated. Specifically, the doping of $Cl^-$, $Br^-$, $S^{2-}$ at Sb sites, $Cl^-$ and $Br^-$ at S sites was studied. All these doping strategies were targeted to introduce mobile lithium vacancies. The thermodynamic stability of the anion doped compounds was assessed by the convex hull energy.

In addition, the substitutional energy for the replacement of X' dopant at X site was determined as evaluated according to the formula:

$$E_{sub} = E_{dope} + E_{LiX} - E_{undoped} - E_{LiX'}$$

where LiX represents: $Li_3Sb$ and $Li^2S$ when X is Sb and S, respectively and LiX' represents LiCl, LiBr and $Li_2S$ when X' is Cl, Br, and S, respectively.

The doping energy was evaluated as the energy cost to create one mobile Li vacancy.

The evaluation results for each of the space groups are discussed in the following paragraphs. The inp-775372 phase of $Li_5SbS$ was not evaluated due to the high convex hull energy (greater than 100 meV/atom) indicating low thermodynamic stability.

Figure 2:
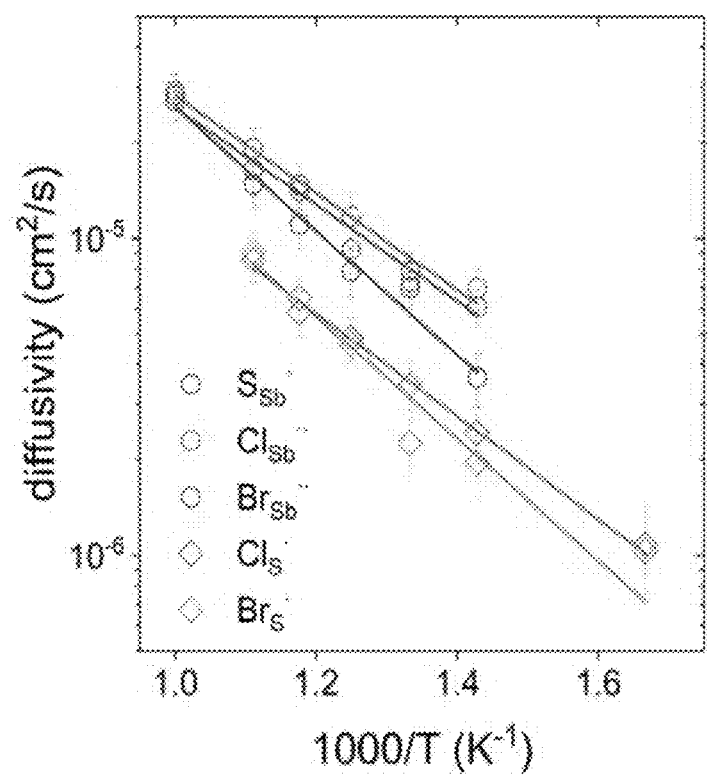
FIG. 2 shows AMID simulated diffusivity for anion doped Li5SbS with the space group of P4/mmm (MP ID: 760409).

A. P4/mmm $Li_5SbS$ $Li_5SbS$ with the space group of P4/mmm has tetragonal structure as shown in FIG. 1(a). In the crystalline structure the $Sb^{3-}$ and $S^{2-}$ form layers along c-axis and all anions form a face-centered-cubic like lattice. Li occupies all tetrahedral sites and half of the octahedral sites in the fcc framework. FIG. 2 shows the AIMD simulated diffusivities at different doped compositions.

The extrapolated conductivity at 300 K and the critical thickness of coating for a resistance of 1 $\Omega \cdot cm^2$, the range of conductivity and the convex hull energy at the doped composition are listed in Table 2. The doping of halogen at S site and sulfur at Sb site resulted in the conductivity in the order of 0.1 mS/cm. For the doping of halogen at Sb site, the conductivity increased to over 1 mS/cm. These conductivity values corresponded to the critical thickness of 1 to 10 μm for an increase of resistance of 1 $\Omega \cdot cm^2$. The convex hull energy of anion doped P4/mmm-$Li_5SbS$ is around 60-70 meV/atom, which is about 10-20 meV/atom higher than the undoped compound and indicates similar stability after doping.

TABLE 2

| doped composition | defect | Critical thickness (μm) | $\sigma_{300}$ (mS/cm) | Range of $\sigma_{300}$ | $E_{hull}$ (meV/atom) | Sub energy (eV/Vac) |
| --- | --- | --- | --- | --- | --- | --- |
| $Li_{4.89}Sb_{0.89}S_{1.11}$ | $S_{Sb}$ | 1.8 | 0.18 | [0.024, 1.294] | 63 | 1.18 |
| $Li_{4.77}Sb_{0.89}SCl_{0.11}$ | $Cl_{Sb}$ | 18.0 | 1.80 | [0.34, 9.31] | 67 | 0.45 |
| $Li_{4.77}Sb_{0.89}SBr_{0.11}$ | $Br_{Sb}$ | 17.0 | 1.70 | [0.43, 6.77] | 63 | 0.34 |
| $Li_{4.89}SbS_{0.89}Cl_{0.11}$ | $Cl_S$ | 4.9 | 0.49 | [0.18, 1.38] | 61 | 0.23 |
| $Li_{4.89}SbS_{0.89}Br_{0.11}$ | $Br_S$ | 1.1 | 0.11 | [0.05, 2.67] | 60 | 0.12 |

Figure 1B:
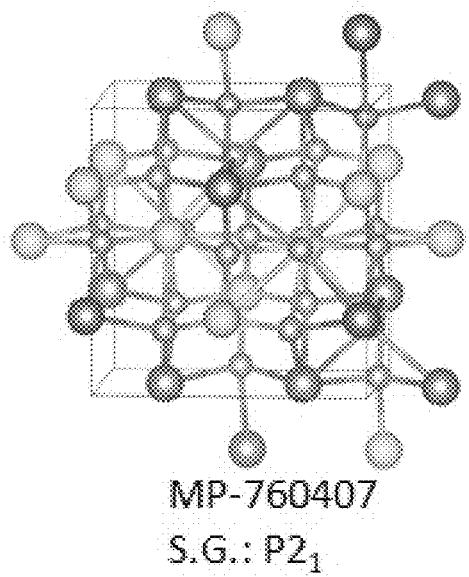
FIG. 1B shows the crystal structure of lithium antimony sulfides of space group $P2_1$.
Figure 1C:
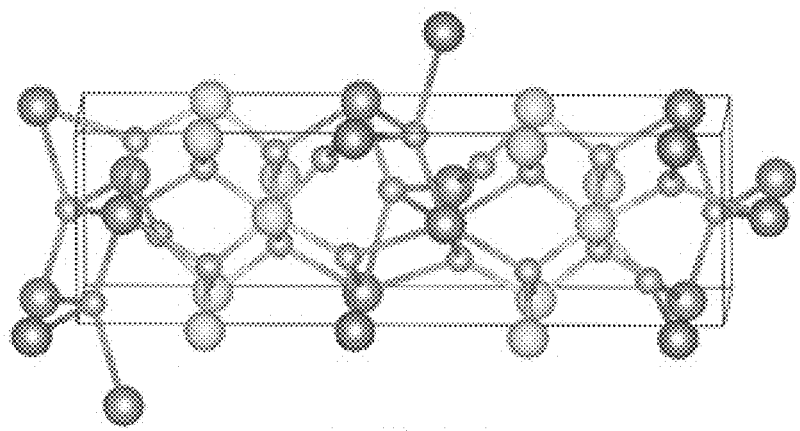
FIG. 1C shows the crystal structure of lithium antimony sulfides of space group $P2_12_12_1$.
Figure 1D:
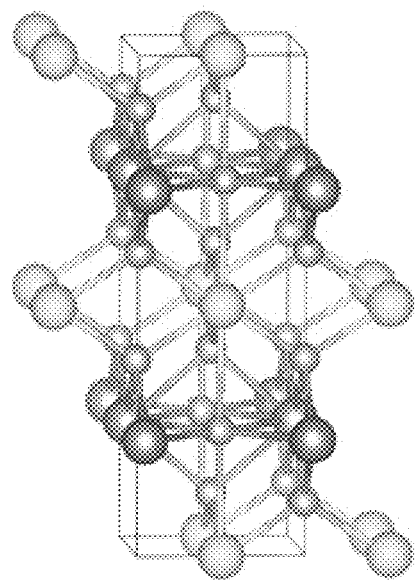
FIG. 1D shows the crystal structure of lithium antimony sulfides of space group Pmma.
Figure 1E:
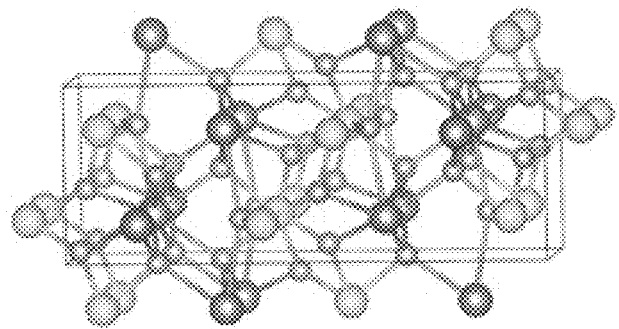
FIG. 1E shows the crystal structure of lithium antimony sulfides of space group C2/c.
Figure 3:
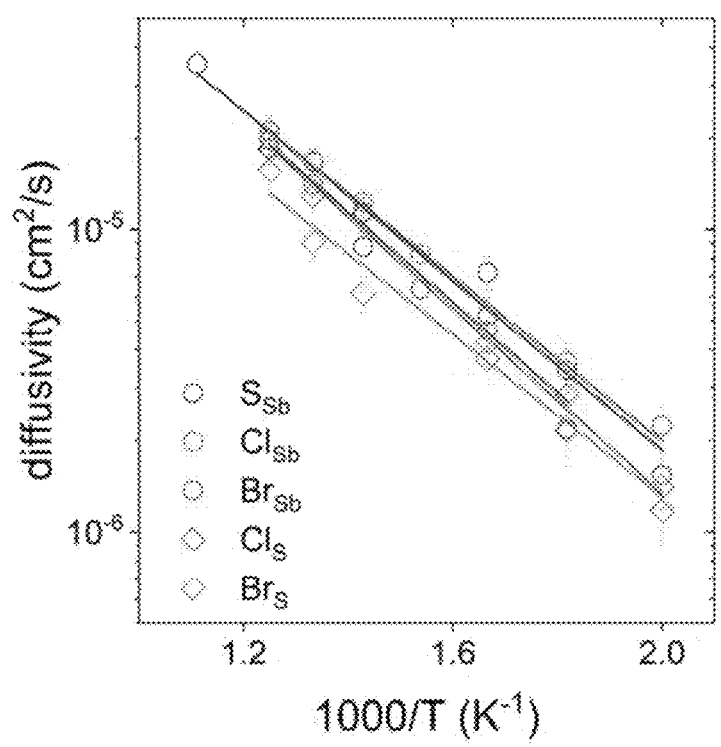
FIG. 3 shows AMID simulated diffusivity for anion doped $Li_5SbS$ with the space group of $P2_1$ (MP ID: 760407).

B. $P2_1$-$Li_5SbS$ $Li_5SbS$ with the space group of P21 has monoclinic structure as shown in FIG. 1(b). All lithium are tetrahedrally bonded to three Sb and one S, or to three S and one Sb. FIG. 3 shows the AIMD simulated diffusivities at different doped compositions. The extrapolated conductivity at 300 K and the critical thickness of coating for a resistance of 1 $\Omega \cdot cm2$, the range of conductivity, the convex hull energy at the doped composition are listed in Table 3. All doping strategies yielded the conductivity in the order of 1-10 mS/cm which indicates the material not only offers utility for thick coating layer on metallic lithium anode but can be considered as suitable as a solid electrolyte. However, from the convex hull energy we found the doped compounds are largely unstable. In addition, the negative substitutional energy also indicated the instability of the parent polymorph.

TABLE 3

| doped composition | defect | Critical thickness (μm) | $\sigma_{300}$ (mS/cm) | Range of $\sigma_{300}$ | $E_{hull}$ (meV/atom) | Sub energy (eV/Vac) |
| --- | --- | --- | --- | --- | --- | --- |
| $Li_{4.875}Sb_{0.875}S_{1.125}$ | $S_{Sb}$ | 61.0 | 6.10 | [1.39, 26.89] | 92 | 0.09 |
| $Li_{4.75}Sb_{0.875}SCl_{0.125}$ | $Cl_{Sb}$ | 71.2 | 7.12 | [3.48, 14.55] | 89 | −0.07 |
| $Li_{4.75}Sb_{0.875}SBr_{0.125}$ | $Br_{Sb}$ | 35.2 | 3.52 | [0.74, 16.79] | 87 | −0.13 |
| $Li_{4.875}SbS_{0.875}Cl_{0.125}$ | $Cl_S$ | 30.8 | 3.08 | [1.01, 9.49] | 73 | −0.93 |
| $Li_{4.875}SbS_{0.875}Br_{0.125}$ | $Br_S$ | 53.4 | 5.34 | [0.90, 31.26] | 70 | −1.10 |

Figure 4:
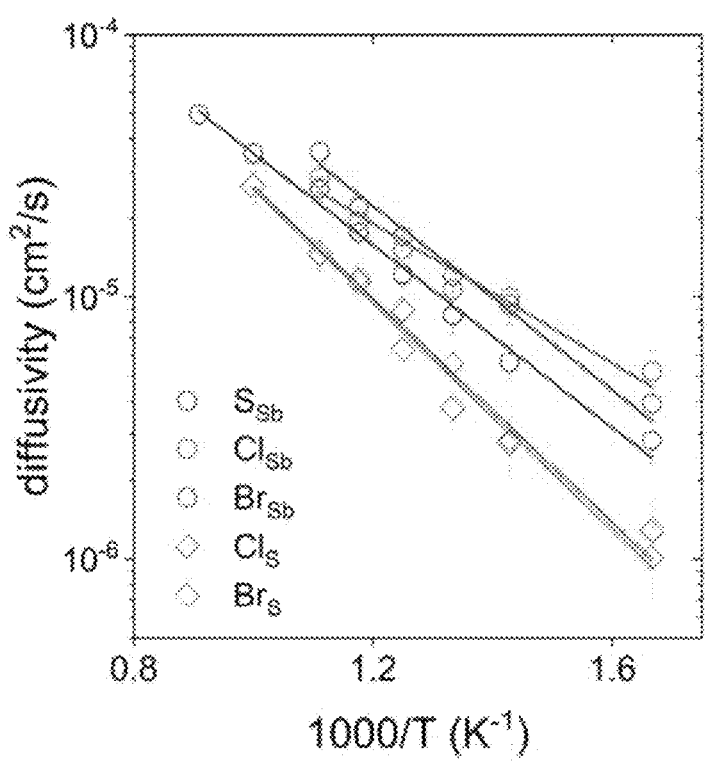
FIG. 4 shows AIMD simulated diffusivity for anion doped Li5SbS with the space group of $P2_12_12_1$ (MP ID: 754496).

C. $P2_12_12_1$-$Li_5SbS$ $Li_5SbS$ with the space group of $P2_12_12_1$ has orthorhombic structure shown in FIG. 1(c). Lithium ions are either tetrahedrally bonded or bonded in a triangular environment. FIG. 4 shows the AIMD simulated diffusivities at different doped compositions. The extrapolated conductivity at 300 K and the critical thickness of coating for a resistance of 1 Ω·cm2, the range of conductivity, the convex hull energy at the doped composition are listed in Table 4. Doping at Sb site in general had the conductivity about one order of magnitude higher than doping at S site, while the latter has a lower convex hull energy. The critical thickness ranges from 0.1 to 1 μm for doping at S site to 1-100 μm for doping, at Sb site.

TABLE 4

| doped composition | defect | Critical thickness (μm) | $\sigma_{300}$ (mS/cm) | Range of $\sigma_{300}$ | $E_{hull}$ (meV/atom) | Sub energy (eV/Vac) |
|---|---|---|---|---|---|---|
| $Li_{4.875}Sb_{0.875}S_{1.125}$ | $S_{Sb}$ | 7.4 | 0.74 | [0.32, 1.76] | 61 | 0.63 |
| $Li_{4.75}Sb_{0.875}SCl_{0.125}$ | $Cl_{Sb}$ | 65.2 | 6.52 | [0.90, 47.44] | 71 | 0.56 |
| $Li_{4.75}Sb_{0.875}SBr_{0.125}$ | $Br_{Sb}$ | 9.6 | 0.96 | [0.13, 7.20] | 69 | 0.50 |
| $Li_{4.875}SbS_{0.875}Cl_{0.125}$ | $Cl_S$ | 0.7 | 0.068 | [0.0066, 0.703] | 60 | 0.53 |
| $Li_{4.875}SbS_{0.875}Br_{0.125}$ | $Br_S$ | 0.6 | 0.056 | [0.012, 0.27] | 45 | 0.41 |

Figure 5:
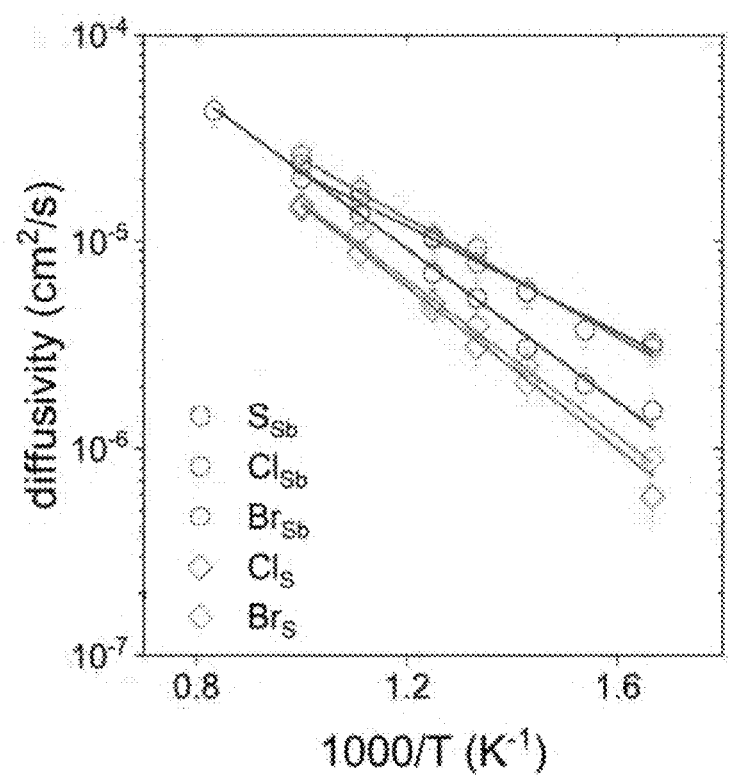
FIG. 5 shows AIMD simulated diffusivity for anion doped $Li_5SbS$ with the space group of Pmrna (MP ID: 1177070).

D. Pmma-$Li_5SbS$ $Li_5SbS$ with the space group of Pmma has orthorhombic structure shown in FIG. 1(d). Similar to the P4/mmm polymorph, the $Sb^{3-}$ and $S^{2-}$ form layers along c-axis and all anions form a face-centered-cubic like lattice. Li occupies all tetrahedral sites and half of the octahedral sites in the fcc framework. FIG. 5 shows the AIMD simulated diffusivities at different doped compositions. The extrapolated conductivity at 300 K and the critical thickness of coating for a resistance of 1 Ω·cm2, the range of conductivity, the convex hull energy at the doped composition are listed in Table 5. The conductivities were also similar to that in the P4/main polymorph, with the corresponded critical thickness ranging from 1 to 100. The convex hull energy is similar to those of P4/mm polymorph (Table 2), indicating the similarity between these two structures.

TABLE 5

| doped composition | defect | Critical thickness (μm) | $\sigma_{300}$ (mS/cm) | Range of $\sigma_{300}$ | $E_{hull}$ (meV/atom) | Sub energy (eV/Vac) |
|---|---|---|---|---|---|---|
| $Li_{4.89}Sb_{0.89}S_{1.11}$ | $S_{Sb}$ | 2.6 | 0.26 | [0.12, 0.55] | 67 | 0.84 |
| $Li_{4.77}Sb_{0.89}SCl_{0.11}$ | $Cl_{Sb}$ | 28.8 | 2.88 | [1.33, 6.22] | 77 | 0.66 |
| $Li_{4.77}Sb_{0.89}SBr_{0.11}$ | $Br_{Sb}$ | 55.0 | 5.5 | [2.04, 14.85] | 72 | 0.53 |
| $Li_{4.89}SbS_{0.89}Cl_{0.11}$ | $Cl_S$ | 1.0 | 0.10 | [0.027, 0.38] | 61 | 0.50 |
| $Li_{4.89}SbS_{0.89}Br_{0.11}$ | $Br_S$ | 1.6 | 0.16 | [0.033, 0.746] | 58 | 0.35 |

Figure 6:
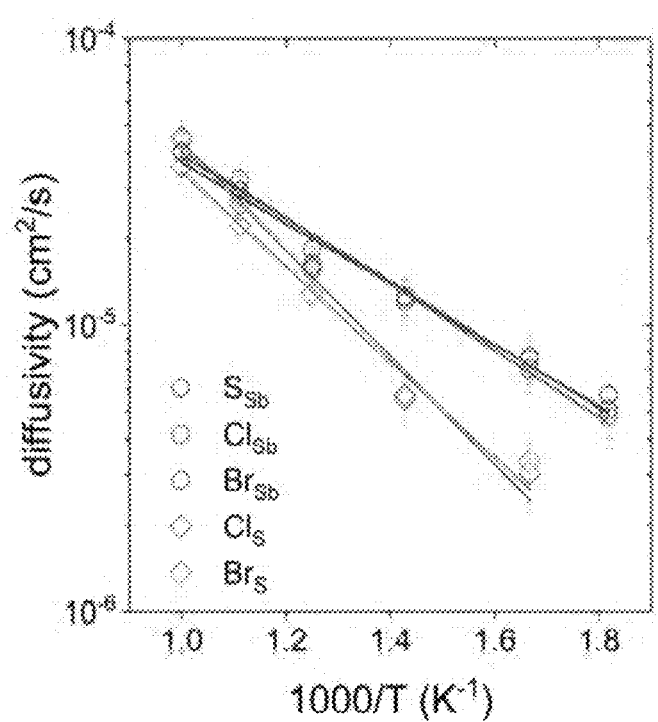
FIG. 6 shows AIMD simulated diffusivity for anion doped $Li_5SbS$ with the space group of P2/c; (MP ID: 753621).

E. C2/c-$Li_5SbS$ $Li_5SbS$ with the space group of C2/c has monoclinic structure as shown FIG. 1(e), Lithium ions are either tetrahedrally bonded or bonded in a triangular environment. FIG. 6 shows the AIMD simulated diffusivities at different doped compositions. The extrapolated conductivity at 300 K and the critical thickness of coating for a resistance of 1 Ω·cm2, the range of conductivity, the convex hull energy at the doped composition are listed in Table 6. Doping at Sb site had the higher conductivity over 10 mS/cm, while the doping at S site had the conductivity around 0.5-1 mS/cm. This indicates good potential to apply the Sb site doped compounds as solid electrolyte. However, the convex hull energies were around 70-80 meV/atom, indicating thermodynamic instability.

TABLE 6

| doped composition | defect | Critical thickness (μm) | $\sigma_{300}$ (mS/cm) | Range of $\sigma_{300}$ | $E_{hull}$ (meV/atom) | Sub energy (eV/Vac) |
|---|---|---|---|---|---|---|
| $Li_{4.875}Sb_{0.875}S_{1.125}$ | $S_{Sb}$ | 294.4 | 29.44 | [0.77, 88.73] | 76 | 0.67 |
| $Li_{4.75}Sb_{0.875}SCl_{0.125}$ | $Cl_{Sb}$ | 185.5 | 18.55 | [4.89, 70.33] | 83 | 0.49 |
| $Li_{4.75}Sb_{0.875}SBr_{0.125}$ | $Br_{Sb}$ | 248.4 | 24.84 | [10.05, 61.2] | 79 | 0.37 |
| $Li_{4.875}SbS_{0.875}Cl_{0.125}$ | $Cl_S$ | 4.4 | 0.44 | [0.052, 3.80] | 68 | 0.23 |
| $Li_{4.875}SbS_{0.875}Br_{0.125}$ | $Br_S$ | 10.8 | 1.08 | [0.20, 5.91] | 78 | 0.75 |

Figure 1F:
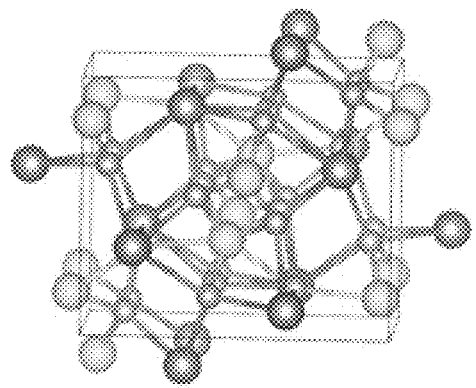
FIG. 1F shows the crystal structure of lithium antimony sulfides of space group Pnma.
Figure 7:
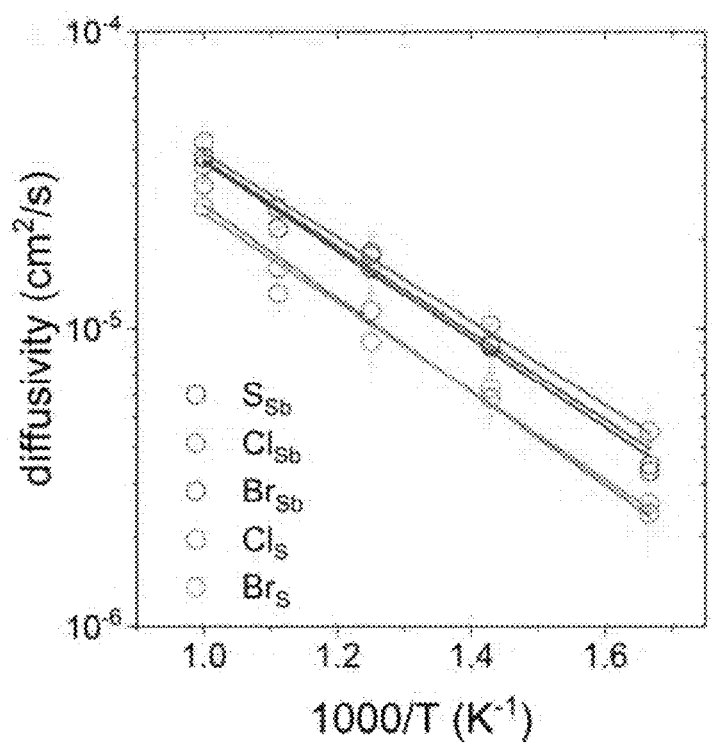
FIG. 7 shows AIMD simulated diffusivity for anion doped $Li_5SbS$ with the space group of Prima (MP ID: 767403).

F. Pnma-$Li_5SbS$ $Li_5SbS$ with the space group of Nina has orthorhombic structure as shown in FIG. 1(f). Lithium ions are either tetrahedrally bonded or bonded in a triangular environment. FIG. 7 shows the AIMD simulated diffusivities at different doped compositions. The extrapolated conductivity at 300 K and the critical thickness of coating for a resistance of 1 Ω·cm2, the range of conductivity, the convex hull energy at the doped composition are listed in Table 7. All doping strategies had the conductivities in the range of 1-5 mS/cm, indicating good potential to apply these compounds as thick coating layer as well as solid electrolyte. The doping at S site in general had better thermodynamic stability that the doping at Sb site.

TABLE 7

| doped composition | defect | Critical thickness (μm) | $\sigma_{300}$ (mS/cm) | Range of $\sigma_{300}$ | $E_{hull}$ (meV/atom) | Sub energy (eV/Vac) |
|---|---|---|---|---|---|---|
| $Li_{4.875}Sb_{0.875}S_{1.125}$ | $S_{Sb}$ | 30.1 | 3.01 | [0.38, 23.69] | 89 | 1.32 |
| $Li_{4.75}Sb_{0.875}SCl_{0.125}$ | $Cl_{Sb}$ | 46.7 | 4.67 | [1.33, 16.42] | 85 | 0.50 |
| $Li_{4.75}Sb_{0.875}BSr_{0.125}$ | $Br_{Sb}$ | 34.6 | 3.46 | [0.93, 12.93] | 72 | 0.15 |
| $Li_{4.875}SbS_{0.875}Cl_{0.125}$ | $Cl_S$ | 13.7 | 1.37 | [0.03, 59.86] | 71 | 0.34 |
| $Li_{4.875}SbS_{0.875}Br_{0.125}$ | $Br_S$ | 19.6 | 1.96 | [0.31, 12.33] | 73 | 0.45 |

Figure 1G:
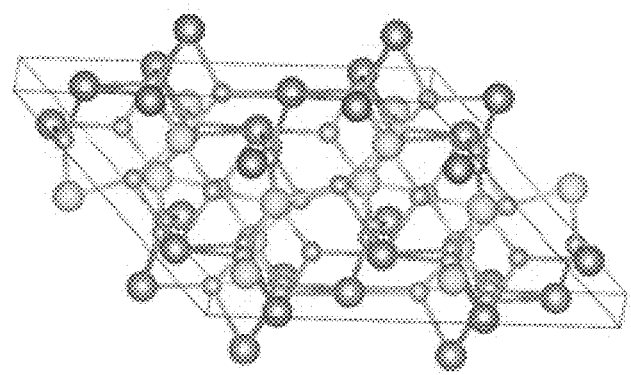
FIG. 1G shows the crystal structure of lithium antimony sulfides of space group P2/c.

G. $P2_1/c$-$Li_5SbS$ $Li_5SbS$ with the space group of $P2_1/c$ has orthorhombic structure as shown in FIG. 1(g). Lithium ions are either tetrahedrally bonded or bonded in a triangular environment. This structure has a high convex hull energy compared to other polymorphs. In AIMD simulation, it was found that the doped materials melted even at 600 K, indicating high instability. Thus the conductivity was not further evaluated.

H. $Li_8Sb_2S$

Figure 1H:
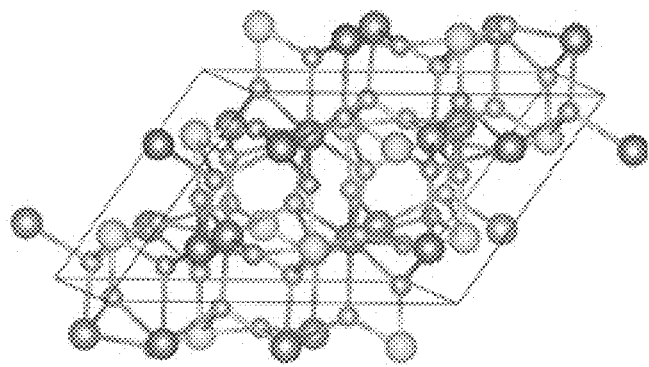
FIG. 1H shows the crystal structure of lithium antimony sulfides of space group C2/c.
Figure 8:
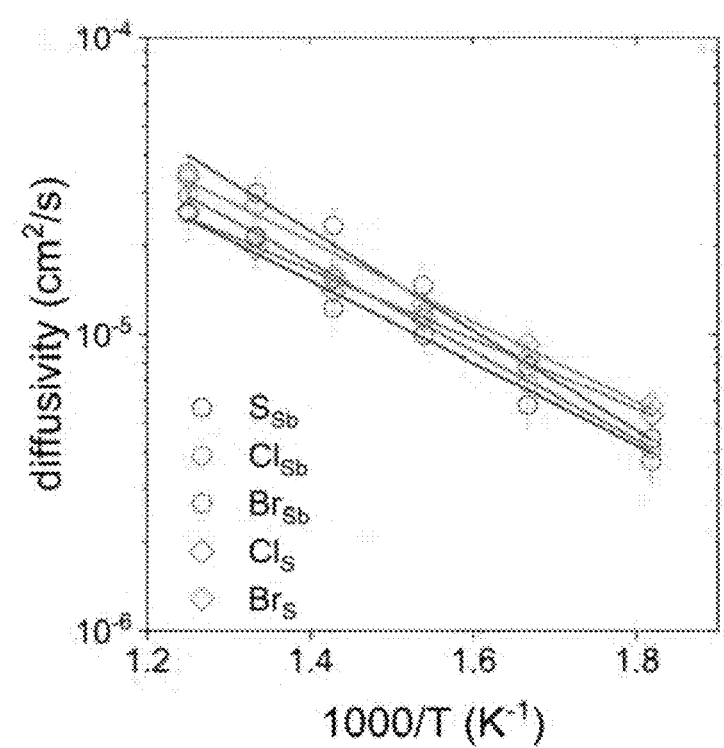
FIG. 8 shows AIMD simulated diffusivity for anion doped Li8Sb2S (MP ID: 768139)

Only one polymorph of $Li_8Sb_2S$ existed in Materials Project database. The structure is monoclinic with lithium ions either tetrahedrally bonded or bonded in a triangular environment as shown in FIG. 1(h). FIG. 8 shows the AIMD simulated diffusivities at different doped compositions. The extrapolated conductivity at 300 K and the critical thickness of coating for a resistance of 1 Ω·cm2, the range of conductivity, the convex hull energy at the doped composition are listed in Table 8. All doping strategies had the conductivities in the range of 1-20 mS/cm, indicating good potential to apply these compounds as thick coating layer as well as solid electrolyte. The doping at S site in general had better conductivity and thermodynamic stability than doping at the Sb site.

TABLE 8

| doped composition | defect | Critical thickness (μm) | $\sigma_{300}$ (mS/cm) | Range of $\sigma_{300}$ | $E_{hull}$ (meV/atom) | Sub energy (eV/Vac) |
|---|---|---|---|---|---|---|
| $Li_{7.75}Sb_{1.75}S_{1.25}$ | $S_{Sb}$ | 70.3 | 7.03 | [1.86, 26.53] | 85 | 0.55 |
| $Li_{7.75}Sb_{1.75}SCl_{0.25}$ | $Cl_{Sb}$ | 48.8 | 4.88 | [3.01, 7.91] | 99 | 0.53 |
| $Li_{7.75}Sb_{1.75}SBr_{0.25}$ | $Br_{Sb}$ | 26.4 | 2.64 | [0.46, 15.24] | 95 | 0.46 |
| $Li_{7.75}Sb_2S_{0.75}Cl_{0.25}$ | $Cl_S$ | 198.9 | 19.89 | [11.11, 39.60] | 75 | 0.15 |
| $Li_{7.75}Sb_2S_{0.75}Br_{0.25}$ | $Br_S$ | 110.0 | 11.0 | [3.96, 30.52] | 74 | 0.10 |

Figure 9:
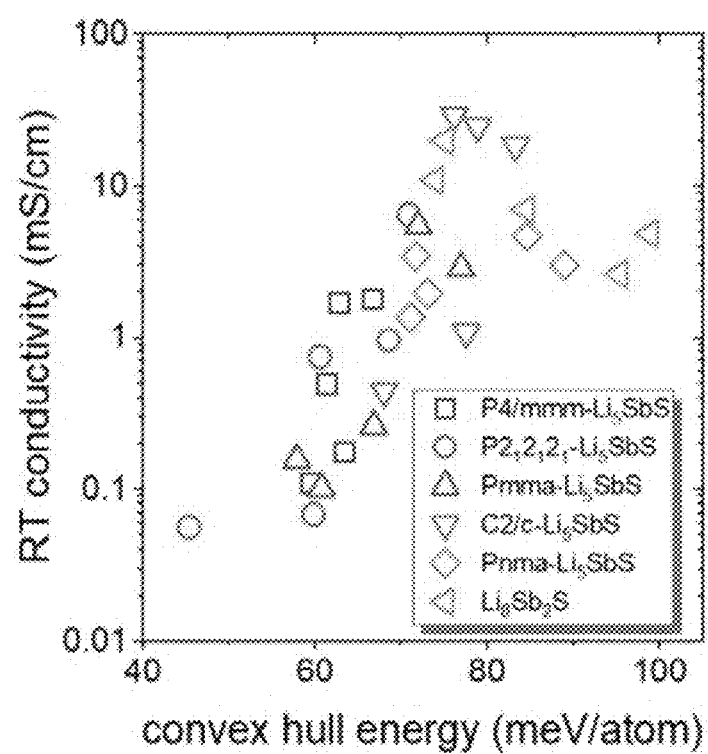
FIG. 9 shows a correlation between the convex hull energy and conductivity of lithium antimonide sulfides.

Graphing the convex hull energy and conductivity of lithium antimonide sulfides reveals a correlation between these two properties as shown in FIG. 9, in general, larger convex hull energy is associated with better lithium conductivity. It indicates the high thermodynamic instability is beneficial to promote lithium motion. Because a desired coating material and solid electrolyte should satisfy both the requirement of high conductivity and thermodynamic stability, the best candidates for practical application seem to be the P4/mmm, P2$_1$2$_1$2$_1$ and Pmma phases of Li$_5$SbS.

Synthesis of the materials of the embodiments described above may be achieved by solid state reaction between stoichiometric amounts of selected precursor materials. Exemplary methods of solid state synthesis are described for example in each of the following papers: i) Monatshefte für Chemie, 100, 295-303, 1969; ii) Journal of Solid State Chemistry, 128, 1997, 241; iii) Zeitschrift fïr Naturforschung B,50,1995, 1061; iv) Journal of Solid State Chemistry 130, 1997, 90; v) *Journal of Alloys and Compounds*, 645, 2015, S174; and vi) Z. Naturforsch. 51b, 199652 5. Adaptation of these methods to prepare the composite compounds according to the embodiments disclosed herein is well within the capability of one of ordinary skill in the art.

Accordingly, the first embodiment of the present disclosure provides an electrode comprising:
an active layer of lithium metal or a lithium metal alloy; and
a coating layer on a surface of the active layer in contact with the lithium metal or lithium metal alloy;
wherein the coating layer is at least one material having a lithium ion conductivity of at least 10$^{-5}$ S/cm selected from formula (I), formula (II), formula (III) and formula (IV):

$$Li_5SbS \quad (I)$$

$$Li_{5-2x}Sb_{1-x}A_xS \quad (II)$$

$$Li_{5-y}Sb_{1-y}S_{1+y} \quad (III)$$

$$Li_{5-z}SbS_{1-z}H_z \quad (IV)$$

wherein A is at least one anion aliovalently substituted for Sb in sites of the crystal lattice selected from the group of anions consisting of F$^-$, Cl$^-$ and Br$^-$,
H is at least one anion aliovalently substituted for S in sites of the crystal lattice selected from the group of anions consisting of F$^-$, Cl$^-$ and Br$^-$,
x is a number from greater than 0 to 0.5,
y is a number from greater than 0 to 0.5,
z is a number from greater than 0 to 0.5, and
the materials of formulae (I) to (IV) have a crystal structure of a space group selected from the group consisting of P4/mmm, P2$_1$, P2$_1$2$_1$2$_1$, Pmma, P2/c and Pnma.

In an aspect of the first embodiment a thickness of the coating layer is at least 100 nm.

In one specific aspect of the first embodiment the crystal structure of the coating material is of the P4/mmm space group, the lithium ion conductivity is from 0.11 mS/cm to 1.80 mS/cm and a thickness of the coating layer having a resistance of 1 Ω·cm$^2$ is from 1 to 10 μm.

In one specific aspect of the first embodiment the crystal structure of the coating material is of the P2$_1$ space group, the lithium ion conductivity is from 3.0 mS/cm to 6.1 mS/cm and a thickness of the coating layer having a resistance of 1 Ω·cm$^2$ is from 30 μm to 72 μm.

In one specific aspect of the first embodiment the crystal structure of the coating material is of the P2$_1$2$_1$2$_1$ space group, the lithium ion conductivity is from 0.05 mS/cm to 6.6 mS/cm and a thickness of the coating layer having a resistance of 1 Ω·cm$^2$ is from 0.6 μm to 65.2 μm.

In one specific aspect of the first embodiment the crystal structure of the coating material is of the Pmma space group, the lithium ion conductivity is from 0.10 mS/cm to 5.5 mS/cm and a thickness of the coating layer having a resistance of 1 Ω·cm$^2$ is from 1.0 μm to 55 μm.

In one specific aspect of the first embodiment the crystal structure of the coating material is of the P2/c space group, the lithium ion conductivity is from 0.40 mS/cm to 30 mS/cm and a thickness of the coating layer having a resistance of 1 Ω·cm$^2$ is from 4.0 μm to 295 μm.

In one specific aspect of the first embodiment the crystal structure of the coating material is of the Pnma space group, the lithium ion conductivity is from 1.3 mS/cm to 4.7 mS/cm and a thickness of the coating layer having a resistance of 1 Ω·cm$^2$ is from 19 μm to 47 μm.

In preferred aspects of the first embodiment the coating layer may be a material of formulae (I) to (III) have a crystal structure of a space group selected from the group consisting of P4/mmm, P2$_1$2$_1$2$_1$ and Pmma.

In a second embodiment the present disclosure provides a battery comprising the electrode of the first embodiment, wherein the battery is a solid state lithium metal battery.

Thus, the battery may comprise an anode according to the first embodiment described above; a cathode; and a solid state lithium ion electrolyte located between the anode and the cathode.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

The solid state electrolyte may be any known in the art and may include the materials of formula (I), formula (II) and formula (III) as described above. Additionally the materials disclosed in any of U.S. application Ser. No. 15/626,696, filed Jun. 19, 2017, U.S. 15/805,672, filed Nov. 7, 2017, U.S. application Ser. No. 16/013,495, filed Jun. 20, 2018, U.S. application Ser. No. 16/114,946 filed Aug. 28, 2018, U.S. application Ser. No. 16/142,217 filed Sep. 26, 2018, U.S. application Ser. No. 16/144,157 filed Sep. 27, 2018 U.S. application Ser. No. 16/153,335 filed Oct. 10, 2018, U.S. application Ser. No. 16/155,349 filed Oct. 9, 2018, U.S. application Ser. No. 16/264,294, filed Jan. 31, 2019. U.S. application Ser. No. 16/570,811, filed Sep. 13, 2019, and U.S. application Ser. No. 16/570,888, filed Sep. 13, 2019, may be suitable. One of ordinary skill in the art may construct solid state batteries by suitable combinations of these materials.

In a third embodiment the present disclosure provides an electrode comprising:
an active layer of lithium metal or a lithium metal alloy; and
a coating layer on a surface of the active layer in contact with the lithium metal or lithium metal alloy;

wherein the coating layer is at least one material having a lithium ion conductivity of at least $10^{-5}$ S/m selected from formula (V), formula (VI), formula (VII) and formula (VIII):

$$Li_8Sb_2S \qquad (V)$$

$$Li_{8-2m}Sb_{2-m}A_mS \qquad (VI)$$

$$Li_{8-n}Sb_{2-n}S_{1+n} \qquad (VII)$$

$$Li_{8-k}Sb_2S_{1-k}H_k \qquad (VIII)$$

wherein A is at least one anion aliovalently substituted for Sb in sites of the crystal lattice selected from the group of anions consisting of F$^-$, Cl$^-$ and Br$^-$, H is at least one anion aliovalently substituted for S in sites of the crystal lattice selected from the group of anions consisting of F$^-$, Cl$^-$ and Br$^-$, m is a number from greater than 0 to 0.5,
n is a number from greater than 0 to 0.5,
k is a number from greater than 0 to 0.5, and
the materials of formulae (V) to (VIII) have a crystal structure of space group C2/c.

In an aspect of the third embodiment the lithium ion conductivity of the coating material is from 2.6 mS/cm to 20 mS/cm and a thickness of a coating layer having a resistance of 1 Ω·cm$^2$ is from 25 μm to 200 μm.

In a fourth embodiment the present disclosure provides a battery comprising the electrode of the third embodiment, wherein the battery is a solid state lithium metal battery. Thus, the battery may comprise an anode according to the third embodiment described above; a cathode; and a solid state lithium ion electrolyte located between the anode and the cathode.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

The solid state electrolyte may be any known in the art and may include the materials of formula (I), formula (II) and formula (III) as described above. Additionally the materials disclosed in any of U.S. application Ser. No. 15/626,696, filed Jun. 19, 2017, U.S. Ser. No. 15/805,672, filed Nov. 7, 2017, U.S. application Ser. No. 16/013,495, filed Jun. 20, 2018, U.S. application Ser. No. 16/114,946 filed Aug. 28, 2018, U.S. application Ser. No. 16/142,217 filed Sep. 26, 2018, U.S. application Ser. No. 16/144,157 filed Sep. 27, 2018 U.S. application Ser. No. 16/153,335 filed Oct. 10, 2018, U.S. application Ser. No. 16/155,349 filed Oct. 9, 2018, U.S. application Ser. No. 16/264,294, filed Jan. 31, 2019. U.S. application Ser. No. 16/570,811, filed Sep. 13, 2019, and U.S. application Ser. No. 16/570,888, filed Sep. 13, 2019, may be suitable. One of ordinary skill in the art may construct solid state batteries by suitable combinations of these materials.

In a fifth embodiment the present disclosure provides a solid state lithium battery, comprising, in the order listed:

an anode comprising an active layer of lithium metal or a lithium metal alloy;
a coating layer on a surface of the active layer in contact with the lithium metal or lithium metal alloy;
a solid electrolyte conductive of lithium ions contacting the coating layer; and
a cathode comprising an active layer which adsorbs or intercalates lithium ions;

wherein the coating layer is at least one material having a lithium ion conductivity of at least $10^{-5}$ S/cm selected from formula (I), formula (II), formula (III) and formula (IV):

$$Li_5SbS \qquad (I)$$

$$Li_{5-2x}Sb_{1-x}A_xS \qquad (II)$$

$$Li_{5-y}Sb_{1-y}S_{1+y} \qquad (III)$$

$$Li_{5-z}SbS_{1-z}H_z \qquad (IV)$$

wherein A is at least one anion aliovalently substituted for Sb in sites of the crystal lattice selected from the group of anions consisting of F$^-$, Cl$^-$ and Br$^-$, H is at least one anion aliovalently substituted for S in sites of the crystal lattice selected from the group of anions consisting of F$^-$, Cl$^-$ and Br$^-$, x is a number from greater than 0 to 0.5,
y is a number from greater than 0 to 0.5,
z is a number from greater than 0 to 0.5, and
the materials of formulae (I) to (IV) have a crystal structure of a space group selected from the group consisting of P4/mmm, P2$_1$, P2$_1$2$_1$2$_1$, Pmma, P2/c and Pnma.

In a special aspect of the fifth embodiment a thickness of the coating layer is at least 100 nm.

In one specific aspect of the fifth embodiment the crystal structure of the coating material is of the P4/mmm space group, the lithium ion conductivity is from 0.11 mS/cm to 1.80 mS/cm and a thickness of the coating layer having a resistance of 1 Ω·cm$^2$ is from 1 to 10 μm.

In one specific aspect of the fifth embodiment the crystal structure of the coating material is of the P2$_1$ space group, the lithium ion conductivity is from 3.0 mS/cm to 6.1 mS/cm and a thickness of the coating layer having a resistance of 1 Ω·cm$^2$ is from 30 μm to 72 μm.

In one specific aspect of the fifth embodiment the crystal structure of the coating material is of the P2$_1$2$_1$2$_1$ space group, the lithium ion conductivity is from 0.05 mS/cm to 6.6 mS/cm and a thickness of the coating layer having a resistance of 1 Ω·cm$^2$ is from 0.6 μm to 65.2 μm.

In one specific aspect of the fifth embodiment the crystal structure of the coating material is of the Pmma space group, the lithium ion conductivity is from 0.10 mS/cm to 5.5 mS/cm and a thickness of the coating layer having a resistance of 1 Ω·cm$^2$ is from 1.0 μm to 55 μm.

In one specific aspect of the fifth embodiment the crystal structure of the coating material is of the P2/c space group, the lithium ion conductivity is from 0.40 mS/cm to 30 mS/cm and a thickness of the coating layer having a resistance of 1 Ω·cm$^2$ is from 4.0 μm to 295 μm.

In one specific aspect of the fifth embodiment the crystal structure of the coating material is of the Pmma space group, the lithium ion conductivity is from 1.3 mS/cm to 4.7 mS/cm and a thickness of the coating layer having a resistance of 1 Ω·cm$^2$ is from 19 μm to 47 μm.

In a sixth embodiment the present disclosure provides a solid state lithium battery, comprising, in the order listed:

an anode comprising an active layer of lithium metal or a lithium metal alloy;

a coating layer on a surface of the active layer in contact with the lithium metal or lithium metal alloy;
a solid electrolyte conductive of lithium ions contacting the coating layer; and
a cathode comprising an active layer which adsorbs or intercalates lithium ions;
wherein the coating layer is at least one material having a lithium ion conductivity of at least $10^{-5}$ S/cm selected from formula (V), formula (VI), formula (VII) and formula (VIII):

$$Li_8Sb_2S \quad (V)$$

$$Li_{8-2m}Sb_{2-m}A_mS \quad (VI)$$

$$Li_{8-n}Sb_{2-n}S_{1+n} \quad (VII)$$

$$Li_{8-k}Sb_2S_{1-k}H_k \quad (VIII)$$

wherein A is at least one anion aliovalently substituted for Sb in sites of the crystal lattice selected from the group of anions consisting of $F^-$, $Cl^-$ and $Br^-$,
H is at least one anion aliovalently substituted for S in sites of the crystal lattice selected from the group of anions consisting of $F^-$, $Cl^-$ and $Br^-$,
m is a number from greater than 0 to 0,5,
n is a number from greater than 0 to 0.5,
k is a number from greater than 0 to 0.5, and
the materials of formulae (V) to (VIII) have a crystal structure of space group C2/c.

In an aspect of the sixth embodiment the lithium ion conductivity of the coating layer is from 2.6 mS/cm to 20 mS/cm and a thickness of the coating layer having a resistance of 1 Ω·cm² is from 25 μm to 200 μm.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. An electrode comprising:
an active layer of lithium metal or a lithium metal alloy; and
a coating layer on a surface of the active layer in contact with the lithium metal or lithium metal alloy;
wherein the coating layer is at least one material having a lithium ion conductivity of at least $10^{-5}$ S/cm selected from formula (V), formula (VI), formula (VII) and formula (VIII):

$$Li_8Sb_2S \quad (V)$$

$$Li_{8-2m}Sb_{2-m}A_mS \quad (VI)$$

$$Li_{8-n}Sb_{2-n}S_{1+n} \quad (VII)$$

$$Li_{8-k}Sb_2S_{1-k}H_k \quad (VIII)$$

wherein A is at least one anion aliovalently substituted for Sb in sites of the crystal lattice selected from the group of anions consisting of $F^-$, $Cl^-$ and $Br^-$,
H is at least one anion aliovalently substituted for S in sites of the crystal lattice selected from the group of anions consisting of $F^-$, $Cl^-$ and $Br^-$,
m is a number from greater than 0 to 0.5,
n is a number from greater than 0 to 0.5,
k is a number from greater than 0 to 0.5, and
the materials of formulae (V) to (VIII) have a crystal structure of space group C2/c.

2. The electrode of claim 1, wherein
the lithium ion conductivity of the coating layer is from 2.6 mS/cm to 20 mS/cm,
a thickness of the coating layer is from 25 μm to 200 μm, and
a resistance of the coating layer is 1 Ω·cm².

3. A battery comprising the electrode of claim 1, wherein the battery is a lithium metal battery.

4. A solid state lithium battery, comprising, in the order listed:
an anode comprising an active layer of lithium metal or a lithium metal alloy;
a coating layer on a surface of the active layer in contact with the lithium metal or lithium metal alloy;
a solid electrolyte conductive of lithium ions contacting the coating layer; and
a cathode comprising an active layer which adsorbs or intercalates lithium ions;
wherein the coating layer is at least one material having a lithium ion conductivity of at least $10^{-5}$ S/cm selected from formula (V), formula (VI), formula (VII) and formula (VIII):

$$Li_8Sb_2S \quad (V)$$

$$Li_{8-2m}Sb_{2-m}A_mS \quad (VI)$$

$$Li_{8-n}Sb_{2-n}S_{1+n} \quad (VII)$$

$$Li_{8-k}Sb_2S_{1-k}H_k \quad (VIII)$$

wherein A is at least one anion aliovalently substituted for Sb in sites of the crystal lattice selected from the group of anions consisting of $F^-$, $Cl^-$ and $Br^-$,
H is at least one anion aliovalently substituted for S in sites of the crystal lattice selected from the group of anions consisting of $F^-$, $Cl^-$ and $Br^-$,
m is a number from greater than 0 to 0.5,
n is a number from greaterthan 0 to 0.5,
k is a number from greater than 0 to 0.5, and
the materials of formulae (V) to (VIII) have a crystal structure of space group C2/c.

5. The solid state lithium battery of claim 4 wherein the lithium ion conductivity of the coating layer is from 2.6 mS/cm to 20 mS/cm,
a thickness of the coating layer is from 25 μm to 200 μm, and
a resistance of the coating layer is 1 Ω·cm².

* * * * *